US010669960B2

(12) United States Patent
Nose et al.

(10) Patent No.: US 10,669,960 B2
(45) Date of Patent: Jun. 2, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Yuki Nose, Kasugai (JP); Yoshiyuki Shogenji, Toyota (JP); Eiji Ikuta, Oobu (JP); Misako Ban, Toyota (JP); Keiichi Myojo, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 80 days.

(21) Appl. No.: 16/132,916

(22) Filed: Sep. 17, 2018

(65) Prior Publication Data
US 2019/0093580 A1    Mar. 28, 2019

(30) Foreign Application Priority Data

Sep. 27, 2017 (JP) .................................. 2017-186391

(51) Int. Cl.
| | |
|---|---|
| *F02D 41/02* | (2006.01) |
| *F02D 41/00* | (2006.01) |
| *F02D 41/14* | (2006.01) |
| *F02D 41/30* | (2006.01) |
| *F02D 43/00* | (2006.01) |
| *F01N 3/10* | (2006.01) |
| *F01N 11/00* | (2006.01) |

(52) U.S. Cl.
CPC ......... *F02D 41/0295* (2013.01); *F01N 3/101* (2013.01); *F01N 11/007* (2013.01); *F02D 41/023* (2013.01); *F02D 41/024* (2013.01); *F02D 41/1475* (2013.01); *F02D 41/30* (2013.01); *F02D 41/0072* (2013.01); *F02D 41/1441* (2013.01); *F02D 41/1456* (2013.01); *F02D 43/00* (2013.01)

(58) Field of Classification Search
CPC .. F02D 41/0072; F02D 41/023; F02D 41/024; F02D 41/0295; F02D 41/1441; F02D 41/1456; F02D 41/1475; F02D 41/30; F02D 43/00; F01N 3/101; F01N 11/007
See application file for complete search history.

(56) References Cited

U.S. PATENT DOCUMENTS

2016/0061317 A1 *   3/2016   Nagai ..................... F16H 59/32
                                                              477/115

FOREIGN PATENT DOCUMENTS

JP          2004-218541          8/2004

* cited by examiner

*Primary Examiner* — Audrey K Bradley
(74) *Attorney, Agent, or Firm* — Finnegan, Henderson, Farabow, Garrett & Dunner, LLP

(57) ABSTRACT

A controller is configured to execute a dither control process of operating fuel injection valves such that at least one of cylinders is a lean combustion cylinder, in which the air-fuel ratio is leaner than the stoichiometric air-fuel ratio, and at least another one of the cylinders is a rich combustion cylinder, in which the air-fuel ratio is richer than the stoichiometric air-fuel ratio, and a limiting process of limiting the dither control process such that the difference in the air-fuel ratio between the cylinders is smaller in a change period, in which a gear ratio of the multi-speed transmission is changed, than in periods except for the change period.

6 Claims, 5 Drawing Sheets

CONTROLLER AND CONTROL METHOD FOR INTERNAL COMBUSTION ENGINE

CROSS REFERENCE TO RELATED APPLICATION

This application claims priority from Japanese Patent Application No. 2017-186391, filed on Sep. 27, 2017, the disclosure of which is incorporated herein by reference in its entirety.

BACKGROUND

The present disclosure relates to a controller configured to control an internal combustion engine that includes an exhaust purification device, which purifies exhaust gas discharged from cylinders, fuel injection valves provided for the respective cylinders, and a crankshaft coupled to a multi-speed transmission.

For example, Japanese Laid-Open Patent Publication No. 2004-218541 discloses a controller that executes dither control. In the dither control, when there is a requirement for an increase in the temperature of a catalyst device (catalyst), the air-fuel ratio is made richer than the stoichiometric air-fuel ratio in some cylinders, while the air-fuel ratio is made leaner than the stoichiometric air-fuel ratio in the other cylinders.

Also, a controller has been known that variably controls the gear ratio of a multi-speed transmission connected to the crankshaft of an internal combustion engine.

When the dither control is executed, the rotational fluctuation of the crankshaft of the internal combustion engine tends to be larger than that when the dither control is prohibited. Therefore, when changing the gear ratio by operating the multi-speed transmission at the execution of the dither control, the controllability of the control of changing the gear ratio may deteriorate.

SUMMARY

Example 1. One aspect provides a controller configured to control an internal combustion engine. The internal combustion engine includes an exhaust purification device, which purifies exhaust gas discharged from a plurality of cylinders, fuel injection valves provided for the respective cylinders, and a multi-speed transmission coupled to a crankshaft. The controller is configured to execute a dither control process and a limiting process. The controller is configured to, in the dither control process, operate the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio. The controller is also configured to, in the limiting process, limit the dither control process such that a difference in the air-fuel ratio between the cylinders is smaller in a change period, in which a gear ratio of the multi-speed transmission is changed, than in periods except for the change period.

In the above-described configuration, since the dither control process is limited through the limiting process such that the difference in the air-fuel ratio between the cylinders decreases in the shift change period, the rotational fluctuation of the crankshaft of the internal combustion engine is suppressed as compared to a case in which the dither control process is not limited. Suppression of the rotational fluctuation limits deterioration of the controllability of the control of changing the ratio between the rotation speed of the output shaft of the multi-speed transmission and the rotation speed of the crankshaft to a gear ratio after the change.

Example 2. In the controller for an internal combustion engine of Example 1, the limiting process includes a reduction process of reducing the difference between the air-fuel ratio of the rich combustion cylinder and the air-fuel ratio of the lean combustion cylinder.

In the above-described configuration, since the dither control process is continued even during the shift change period, it is possible to continue to increase the temperature of the exhaust gas in the exhaust passage through the dither control process, while suppressing the rotational fluctuation of the crankshaft of the internal combustion engine.

Example 3. In the controller for an internal combustion engine of Example 2, the controller executes the dither control process when a warm-up requirement of the exhaust purification device arises. Also, the controller applies the reduction process to the dither control process executed in response to the warm-up requirement of the exhaust purification device.

When a warm-up requirement of the exhaust purification device arises, the exhaust purification device is preferably warmed up at an early stage. If the dither control process is stopped during the gear shaft period, the warm-up of the exhaust purification device may be delayed. The reduction process is therefore of a great utility value.

Example 4. In the controller for an internal combustion engine of any one of Examples 1 to 3, the limiting process includes a prohibition process, in which the controller prohibits the dither control process even if there is a temperature increase requirement of the exhaust gas by the dither control.

In the above-described configuration, the prohibition process enables avoidance of an increase in the rotational fluctuation caused the dither control process during the shaft change period.

Example 5. Another aspect of the present disclosure provides a control method for an internal combustion engine. The internal combustion engine includes an exhaust purification device, which purifies exhaust gas discharged from a plurality of cylinders, fuel injection valves provided for the respective cylinders, and a multi-speed transmission coupled to a crankshaft. The method includes: operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and limiting the dither control process such that a difference in the air-fuel ratio between the cylinders is smaller in a change period, in which a gear ratio of the multi-speed transmission is changed, than in periods except for the change period.

Example 6. A further aspect of the present disclosure provides a controller for an internal combustion engine. The controller is configured to control an internal combustion engine that includes an exhaust purification device, which purifies exhaust gas discharged from a plurality of cylinders, fuel injection valves provided for the respective cylinders, and a multi-speed transmission coupled to a crankshaft. The controller includes processing circuitry. The processing circuitry is configured to execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio, and a limiting process of limiting the dither control process such that a difference in the air-fuel ratio between the cylinders is smaller in a change period, in which a gear ratio of the multi-speed transmission is changed, than in periods except for the change period.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A controller for an internal combustion engine according to one embodiment will now be described with reference to the drawings.

Figure 1:
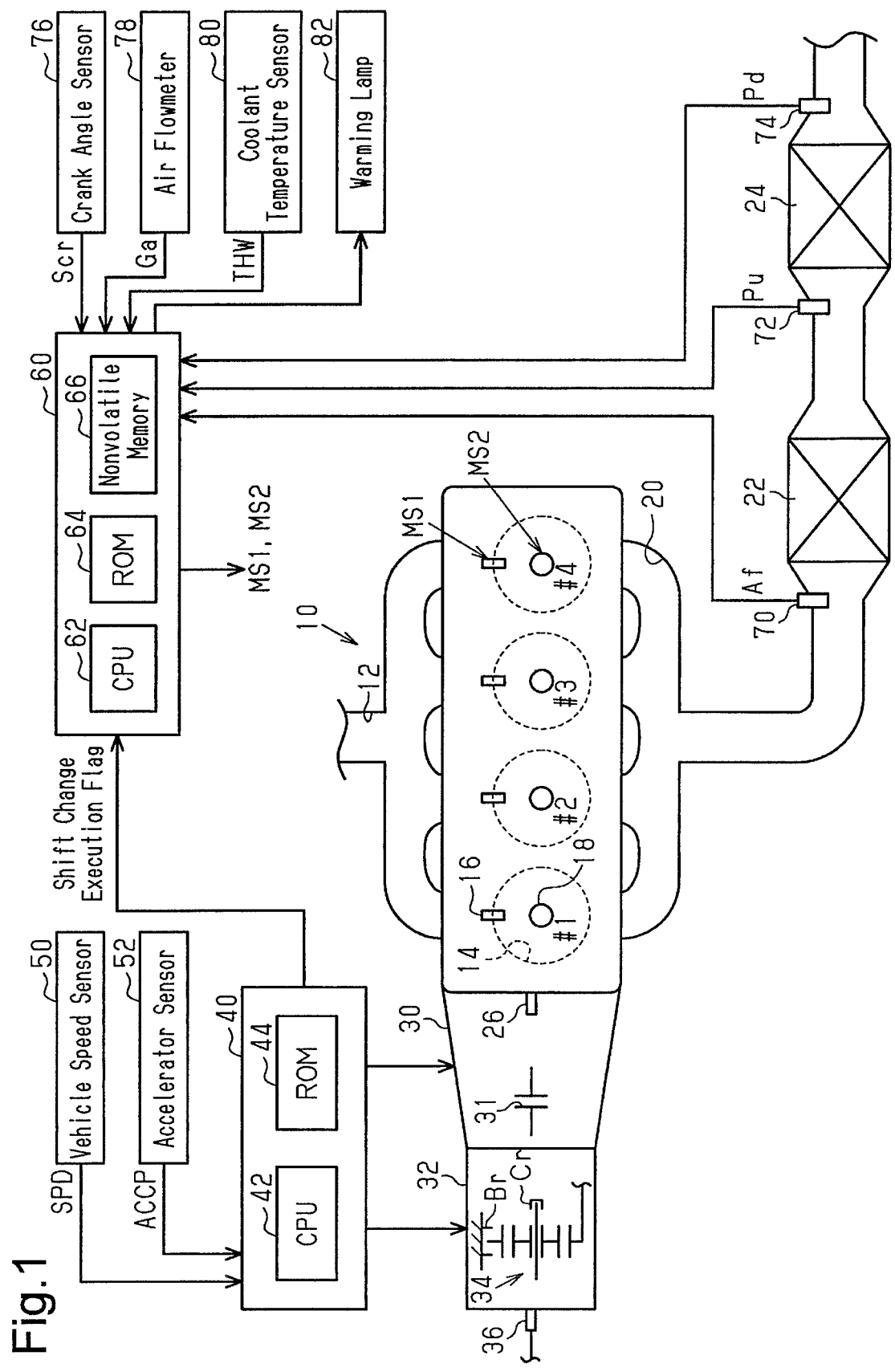
FIG. 1 is a diagram of an internal combustion engine and a controller of the engine according to one embodiment.

In an internal combustion engine 10 shown in FIG. 1, the air drawn in from an intake passage 12 flows into combustion chambers 14 of the respective cylinders #1 to #4. Each of the cylinders #1 to #4 is provided with a fuel injection valve 16 configured to inject fuel and an ignition device 18 configured to generate spark discharge. In the combustion chamber 14, air-fuel mixture is used for combustion, and the air-fuel mixture used for combustion is exhausted to an exhaust passage 20 as exhaust gas. A three-way catalyst 22 having an oxygen storage capacity is provided in the exhaust passage 20. Further, a gasoline particulate filter (GPF 24) is provided downstream of the three-way catalyst 22 in the exhaust passage 20.

The crankshaft 26 of the internal combustion engine 10 is connected to a multi-speed transmission 32 via a torque converter 30 equipped with a lockup clutch 31. The multi-speed transmission 32 includes a planetary gear mechanism 34 and a hydraulically driven frictional engagement elements including brakes Br and clutches Cr. Change in the engagement state of the frictional engagement elements changes the gear ratio, which is the ratio between the rotation speed of the crankshaft 26 and the rotation speed of the output shaft 36 of the multi-speed transmission 32. The gear ratio is changed to any of six to twelve values.

A transmission controller 40 controls the multi-speed transmission 32 to control the gear ratio. When controlling the gear ratio, the transmission controller 40 refers to the vehicle speed SPD detected by a vehicle speed sensor 50 and the accelerator operation amount ACCP detected by an accelerator sensor 52. The transmission controller 40 sets the gear ratio to a lower value when the vehicle speed SPD is high than when it is low. In other words, a higher gear is selected. In addition, when the accelerator operation amount ACCP is large, that is, when the required torque of the engine 10 is large, the transmission controller 40 makes the gear ratio larger than that when it is small. Furthermore, the transmission controller 40 provides hysteresis by differentiating the vehicle speed SPD when changing the gear ratio to a smaller value from the vehicle speed SPD when changing the gear ratio to a greater value. When changing the gear ratio, the transmission controller 40 adjusts the engaging force of the frictional engagement elements to absorb some of the rotational energy of the rotating elements such as the sun gear, the ring gear, and the carrier, which constitute the planetary gear mechanism 34, thereby executing control of suppressing shift shock.

The transmission controller 40 outputs a shift change execution flag during a period from a point in time prior to changing the gear ratio to a point in time when a predetermined period has elapsed after the process of changing the gear ratio ends. The transmission controller 40 includes a CPU 42 and a ROM 44 and executes control of the above-described gear ratio by executing programs stored in the ROM 44 using the CPU 42.

A controller 60 controls the internal combustion engine 10 and controls the controlled portions of the engine 10 such as the fuel injection valves 16 and the ignition devices 18, thereby controlling the controlled amounts such as the torque and the exhaust components. At this time, the controller 60 refers to an air-fuel ratio Af detected by an air-fuel ratio sensor 70 on the upstream side of the three-way catalyst 22, the pressure on the upstream side of the GPF 24 detected by an upstream-side pressure sensor 72 (upstream-side pressure Pu), and the pressure on the downstream side of the GPF 24 detected by a downstream pressure sensor 74 (downstream-side pressure Pd). Further, the controller 60 refers to the output signal Scr of a crank angle sensor 76, the intake air amount Ga detected by an air flowmeter 78, the temperature of the coolant water of the internal combustion engine 10 (coolant temperature THW) detected by a coolant temperature sensor 80. The controller 60 includes a CPU 62, a ROM 64, and a nonvolatile memory 66, which can be electrically rewritten and executes control of the above-described controlled amounts by executing programs stored in the ROM 64 using the CPU 62.

Figure 2:
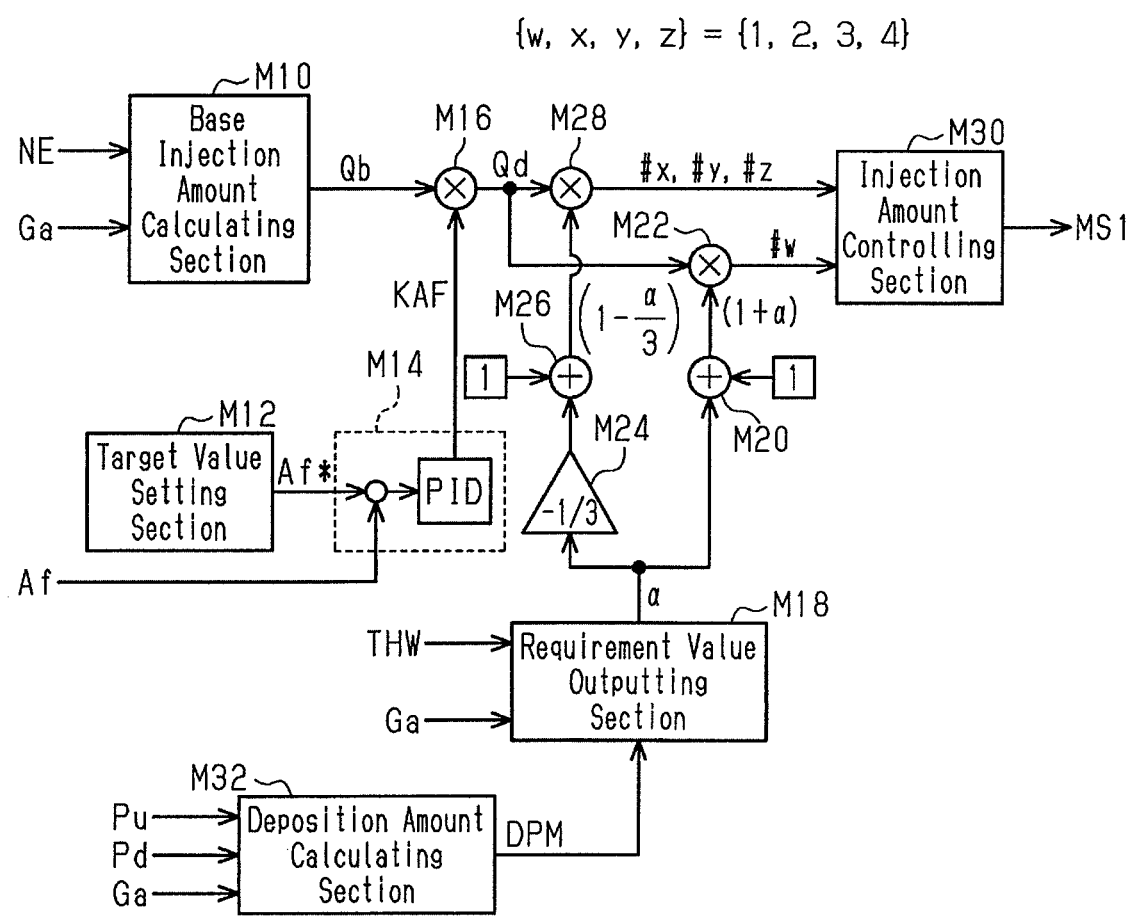
FIG. 2 is a block diagram showing part of a process executed by the controller of the embodiment.

FIG. 2 shows part of the process that is implemented by the CPU 62 executing programs stored in the ROM 64.

Based on the intake amount Ga and the engine speed NE, which is calculated based on the output signal Scr of the crank angle sensor 76, a base injection amount calculating section M10 calculates a base injection amount Qb, which is an operation amount for executing open-loop control to cause the air-fuel ratio of the air-fuel mixture in the combustion chamber 14 to be a target air-fuel ratio.

A target value setting section M12 sets a target value Af* of the feedback control amount that is used to control the air-fuel ratio of the air-fuel mixture in the combustion chamber 14 to be the target air-fuel ratio.

A feedback section M14 calculates a feedback operation amount KAF, which is an operation amount used to execute feedback control to cause the air-fuel ratio Af, which is a feedback control amount, to be the target value Af*. In the present embodiment, the feedback operation amount KAF is the sum of the output values of a proportional element that has, as the input, the difference between the target value Δf* and the air-fuel ratio Af, an integral element, and a differential element.

A feedback correcting section M16 corrects the base injection amount Qb by multiplying the base injection amount Qb by the feedback operation amount KAF, thereby calculating a required injection amount Qd.

A requirement value outputting section M18 calculates and outputs a correction requirement value $\alpha$ used in dither control, in which the air-fuel ratios of the air-fuel mixture to be burned are differentiated among the cylinders, while the components of the entire exhaust gas discharged from the respective cylinders #1 to #4 of the internal combustion engine 10 are made equivalent to that in the case in which the air-fuel ratios of the air-fuel mixture to be burned in all the cylinders #1 to #4 are set to the target air-fuel ratio. In the dither control according to the present embodiment, one of the first to fourth cylinders #1 to #4 is a rich combustion cylinder, in which the air-fuel ratio is made richer than the stoichiometric air-fuel ratio, and the remaining three cylinders are lean combustion cylinders, in which the air-fuel ratio is leaner than the stoichiometric air-fuel ratio. The injection amount in the rich combustion cylinder is calculated by multiplying the required injection amount Qd by a value $(1+\alpha)$. The injection amount in each combustion cylinder is calculated by multiplying the required injection amount Qd by a value $(1-(\alpha/3))$. With the above-described setting of the injection amounts for the lean combustion cylinders and the rich combustion cylinder, if the amounts of air filling the cylinders #1 to #4 are the same, the components of the entire exhaust gas discharged from the respective cylinders #1 to #4 of the engine 10 can be made equivalent to those in a case in which the air-fuel ratios of the air-fuel mixture to be burned in all the cylinders #1 to #4 are equal to the target air-fuel ratio. With the above-described setting of the injection amounts, if the amounts of air filling the cylinders #1 to #4 are the same, the reciprocal of the mean value of the fuel-air ratios of the air-fuel mixture to be burned in the cylinders is the target air-fuel ratio. The fuel-air ratio is the reciprocal of the air-fuel ratio.

The requirement value outputting section M18 sets the correction requirement value $\alpha$ to a value larger than 0 on the condition that a temperature increase requirement of the three-way catalyst 22 or the GPF 24 arises. As a result, the oxygen discharged from the lean combustion cylinders is stored in the three-way catalyst 22, and the oxygen reacts with the unburned fuel components discharged from the rich combustion cylinder, which increases the exhaust temperature and eventually increases the temperature of the three-way catalyst 22 and the GPF 24 on the downstream side of the catalyst 22.

A correction coefficient calculating section M20 adds the correction requirement value $\alpha$ to 1 to calculate the correction coefficient for the required injection amount Qd related to the rich combustion cylinder. A dither correcting section M22 multiplies the required injection amount Qd by the correction coefficient $(1+\alpha)$ to calculate the injection amount command value for the cylinder # w that is designated as a rich combustion cylinder. In this case, w refers to any of 1 to 4.

A multiplication section M24 multiplies the correction requirement value $\alpha$ by $-\frac{1}{3}$. A correction coefficient calculating section M26 adds the output value of the multiplication section M24 to 1 to calculate the correction coefficient for the required injection amount Qd related to each lean combustion cylinder. A dither correcting section M28 multiplies the required injection amount Qd by the correction coefficient $(1-(\alpha/3))$ to calculate the injection amount command value Q1* for the cylinders # x, # y, and # z, which are designated as lean combustion cylinders. In this case, x, y, z are each any of 1 to 4, and w, x, y, z are all different. The rich combustion cylinder is desirably changed among the cylinders #1 to #4 with a period longer than one combustion cycle.

The injection amount controlling section M30 generates an operation signal MS1 for the fuel injection valve 16 of the cylinder # w designated as the rich combustion cylinder based on the injection amount command value output by the dither correcting section M22 and outputs the signal MS1 to the same fuel injection valve 16, thereby operating the fuel injection valve 16 such that the amount of fuel injected from the fuel injection valve 16 becomes the amount corresponding to the injection amount command value. Also, the injection amount controlling section M30 generates an operation signal MS1 for the fuel injection valves 16 of the cylinders # x, # y, and # z designated as the lean combustion cylinders based on the injection amount command value output by the dither correcting section M28 and outputs the signal MS1 to the same fuel injection valves 16, thereby operating the fuel injection valves 16 such that the amount of fuel injected from the fuel injection valves 16 becomes the amount corresponding to the injection amount command value.

A deposition amount calculating section M32 calculates and outputs the amount of PM trapped in the GPF 24 (PM deposition amount DPM) based on the upstream-side pressure Pu, the downstream-side pressure Pd, and the intake air amount Ga. The deposition amount calculating section M32 sets the PM deposition amount DPM to a greater value when the differential pressure obtained by subtracting the downstream-side pressure Pd from the upstream-side pressure Pu is high than when the differential pressure is low. Also, the deposition amount calculating section M32 sets the PM deposition amount DPM to a smaller value when the intake air amount Ga is large than when the intake air amount Ga is small. Specifically, the ROM 64 stores map data in which the differential pressure and the intake air amount Ga are input variables, and the PM deposition amount DPM is an output variable, and the CPU 62 calculates the PM deposition amount DPM by using the map data. The map data refers to a data set of discrete values of input variables and values of output variables each corresponding to a value of the input variables. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

Figure 3:
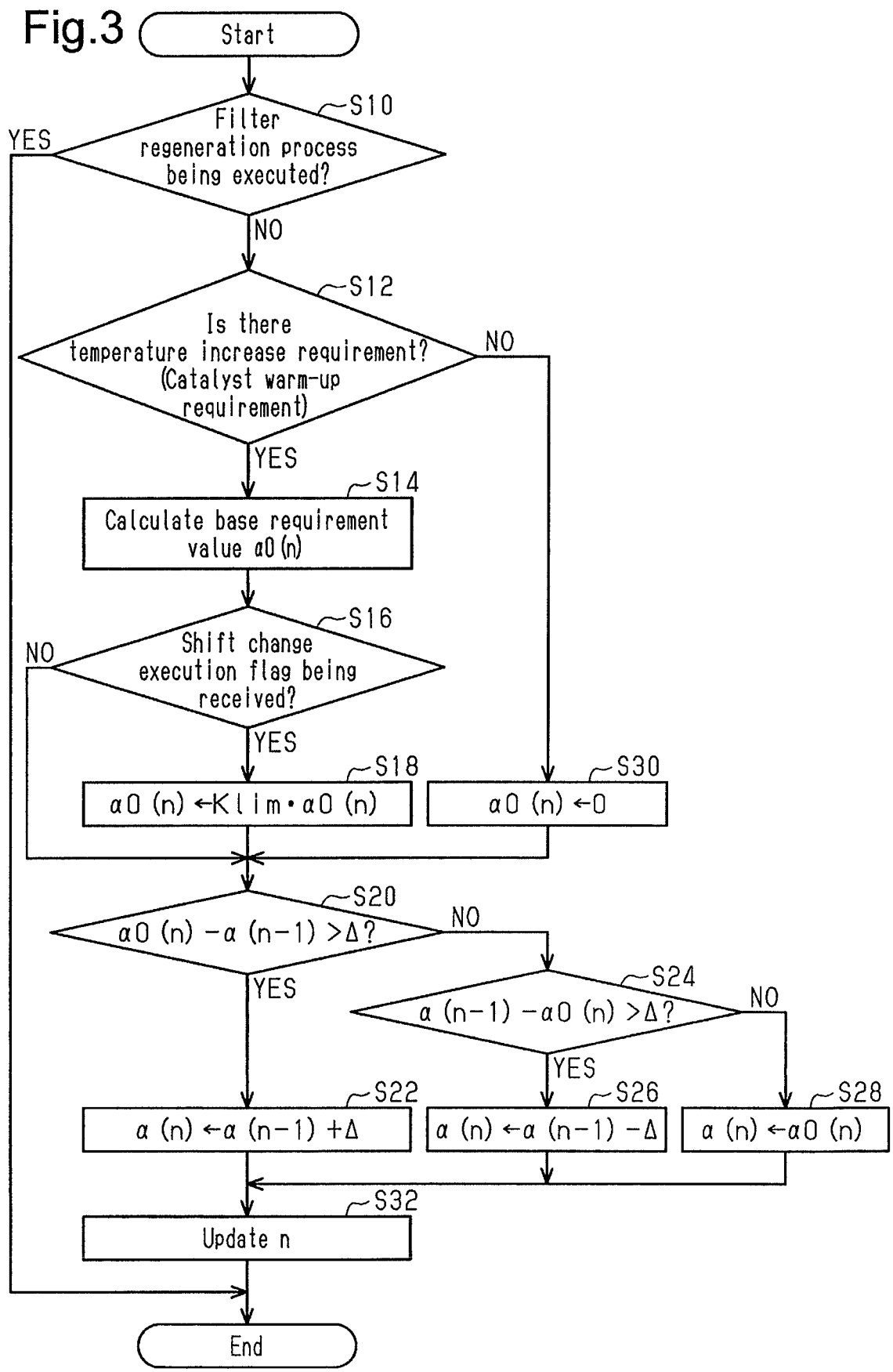
FIG. 3 is a flowchart showing the procedure of a process executed by a requirement value outputting section according to the embodiment.

FIG. 3 shows the procedure of the process executed by the requirement value outputting section M18. The process shown in FIG. 3 is executed by the CPU 62 repeatedly executing programs stored in the ROM 64 at a predetermined interval. In the following description, the number of each step is represented by the letter S followed by a numeral.

In the series of processes shown in FIG. 3, the CPU 62 first determines whether a regeneration process of the GPF 24 (filter regeneration process) is being executed (S10). When determining that the filter regeneration process is not being executed (S10: NO), the CPU 62 determines whether there is a temperature increase requirement of the three-way catalyst 22 (S12). In the present embodiment, it is assumed that a temperature increase requirement of the three-way catalyst 22 arises when a warm-up requirement arises for activation of the three-way catalyst 22. The warm-up requirement of the three-way catalyst 22 arises when the coolant temperature THW is lower than or equal to a predetermined temperature and the integrated air amount from the engine start is less than or equal to a predetermined value (predetermined value>specified value) after it is determined that the temperature of the upstream end of the three-way catalyst 22 is the activation temperature due to the fact that the integrated air amount becomes greater than or equal to the specified value.

When determining that there is a temperature increase requirement of the three-way catalyst 22 (S12: YES), the CPU 62 calculates a base requirement value α0, which is the base value of the correction requirement value α, based on the operating point of the internal combustion engine 10 (S14). In the present embodiment, the operating point is defined by the engine speed NE and a load factor KL, which is calculated based on the engine speed NE and the intake air amount Ga. The load factor KL is the ratio of the inflow air amount per combustion cycle of one cylinder to a reference inflow air amount. The reference inflow air amount may be variably set in accordance with the engine speed NE.

The base requirement value α0 is set to the maximum in the medium load region. This setting is employed in consideration of the fact that, since the combustion is unstable in the low load region as compared with the medium load region, it is more difficult to increase the base requirement value α0 in the low load region than in the medium load region, and that the exhaust temperature is high without executing the dither control in the high load region. Also, the base requirement value α0 is set to a greater value when the engine speed NE is high than when the engine speed NE is low. This is because the combustion is more stable when the engine speed NE is high than when the engine speed NE is low, so that the base requirement value α0 can be easily set to a large value. Specifically, the ROM 64 stores map data that defines the relationship between input variables, which are the engine speed NE and the load factor KL, and an output variable, which is the base requirement value α0. The CPU 62 calculates the base requirement value α by using the map data.

In FIG. 3, the base requirement value α0 is represented by α0($n$) using a variable n in the process of step S14. The variable n is used to designate specific data in the time-series data such as the base requirement value α0. In the following description, the data calculated in the current control cycle of the control cycles in the series of processes in FIG. 3 is defined as n, and the data that was calculated in the previous control cycle is defined as n−1.

Next, the CPU 62 determines whether it is receiving a shift change execution flag (S16). This is a process of determining whether there is a concern that the rotational fluctuation of the crankshaft 26 will hinder the gear shift control due to the dither control based on the base requirement value α0. That is, in the state in which the lockup clutch 31 is engaged, the crankshaft 26 is coupled to the output shaft 36 of the multi-speed transmission 32 at each gear ratio. Thus, the permissible value of the ratio between the rotation speed of the crankshaft 26 and the rotation speed of the output shaft 36 is equal to the gear ratio. When changing the gear ratio, the power transmission path from the crankshaft 26 to the output shaft 36 is changed by canceling the engagement of part of the friction engagement elements or newly engaging other parts. A shift shock occurs if the engaging force of the frictional engagement elements at the newly engaged part is increased when the rotational fluctuation of the crankshaft 26 is great. Also, in a situation in which the transmission controller 40 is executing control to weaken the engaging force of the frictional engagement elements from the viewpoint of protection of the multi-speed transmission 32, an increase in the rotation fluctuation when there is an attempt to increase the engaging force of the newly engaged part may cancel the engagement of the part that should be engaged by the frictional engagement elements. Furthermore, when the transmission controller 40 executes, in order to suppress shift shock, control to adjust the engaging force of the frictional engagement elements at the time of shifting gears and to learn the engaging force based on the rotational fluctuation of the crankshaft 26 at that time, an engaging force deviated from the engaging force adequate for stopping the dither control may be learned (erroneously learned) due to the rotational fluctuation caused by the dither control.

When determining that the shift change execution flag is being received (S16: YES), the CPU 62 substitutes the value obtained by multiplying the base requirement value α0($n$) by a correction factor Klim for the base requirement value α0($n$) (S18). The correction factor Klim is a constant value greater than 0 and less than 1. This setting is employed in consideration of the fact that the base requirement value α0, which is calculated by the process of S14, is set in accordance with the likelihood of the occurrence of rotational fluctuation at each operating point of the internal combustion engine 10, which is determined by the engine speed NE and load factor KL. That is, in the process of S14, the base requirement value α0 is calculated to be a relatively great value at operating points at which the rotational fluctuation is unlikely to increase although the degree of leanness in each lean combustion cylinder and the degree of richness in the rich combustion cylinder are increased. Therefore, the base requirement value α0 can be set to a smaller value at an operation point at which the rotational fluctuation is more likely to be increased by reducing the base requirement value α0 by using the correction factor Klim.

When the process of S18 is completed or when the determination is negative in S16, the CPU 62 determines whether the value obtained by subtracting the previous correction requirement value α(n−1) from the current base requirement value α0($n$) is greater than a threshold value Δ (S20). When determining that the subtraction result is greater than the threshold value Δ (S20: YES), the CPU 62 adds the threshold value Δ to the previous correction requirement value α(n−1) and substitutes the resultant value for the current correction requirement value α(n) (S22). In contrast, when determining that the subtraction result is less than or equal to the threshold value Δ (S20: NO), the CPU 62 subtracts the current base requirement value α0($n$) from the previous correction requirement value α(n−1) and determines whether the resultant value is greater than the threshold value Δ (S24). When determining that the subtraction result is greater than the threshold value Δ (S24: YES), the CPU 62 subtracts the threshold value Δ from the previous correction requirement value α(n−1) and substitutes the resultant value for the current correction requirement value α(n) (S26). When determining that the subtraction result is less than or equal to the threshold value Δ (S22: NO), the CPU 42 substitutes the current base requirement value α0($n$) for the current correction requirement value α(n) (S28).

In contrast, when determining that there is no temperature increase requirement (S12: NO), the CPU 62 substitutes 0 for the base requirement value α0($n$) (S30) and proceeds to the process of S20.

When the processes of S22, S26, and S28 are completed, the CPU 62 updates the variable n (S32). When the process of S32 is completed or when the determination is positive in the process of S10, the CPU 62 temporarily ends the series of processes shown in FIG. 3.

Figure 4:
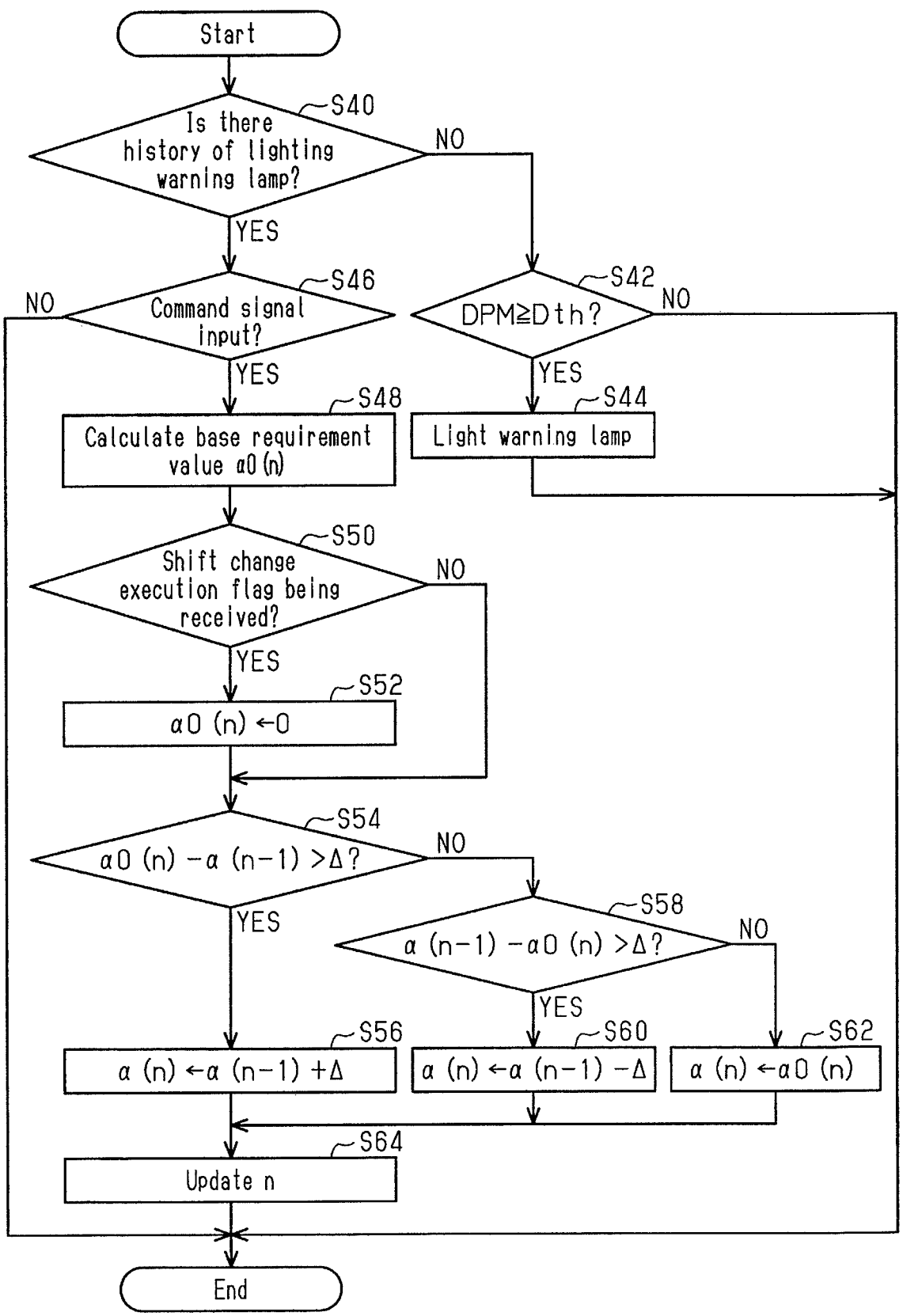
FIG. 4 is a flowchart showing the procedure of a process executed by a requirement value outputting section according to the embodiment.

FIG. 4 shows the procedure of the process executed by the requirement value outputting section M18. The process shown in FIG. 4 is executed by the CPU 62 repeatedly executing programs stored in the ROM 64 at a predetermined interval.

In the series of processes shown in FIG. 4, the CPU 62 first accesses the nonvolatile memory 66 to determine whether there is a history of lighting the warning lamp 82 shown in FIG. 1 (S40). When determining that there is no history (S40: NO), the CPU 62 determines whether the PM deposition amount DPM is greater than or equal to a threshold value DTH (S42). This is a process of determining whether a great amount of the PM deposition amount DPM is likely to hinder the operation of the internal combustion engine 10 if untreated. When determining that the PM deposition amount DPM is greater than or equal to the threshold value Dth, the CPU 62 lights the warning lamp 82 to urge the user of the vehicle equipped with the internal combustion engine 10 to execute a filter regeneration process of burning the PM trapped in the GPF 24 at the repair shop. The CPU 62 then stores such lighting process in the nonvolatile memory 66 (S44).

In contrast, when determining that there is a lighting history of the warning lamp 82 (S40: YES), the CPU 62 determines whether a command signal has been input from outside (S46). The command signal is assumed to be a signal input from the maintenance device to the controller 60 in a state in which a dedicated troubleshooting device (maintenance device) is connected to the controller 60 at the repair shop. That is, the process of S46 is a process of determining whether it is time for the user to take the vehicle to repair shop and have a filter regeneration process executed on the vehicle. When determining that the command signal has been input (S46: YES), the CPU 62 calculates the base requirement value $\alpha 0(n)$ (S48). The base requirement value $\alpha 0(n)$ in this process is greater than the value calculated in the process of S14. This is because, for the filter regeneration process, it is necessary to set the temperature of the GPF 24 higher than the temperature of the three-way catalyst 22 at a warm-up requirement of the three-way catalyst 22 (for example, 600° C. or higher). In particular, the dither control for the filter regeneration process of the present embodiment allows for a rotational fluctuation greater than the allowable rotational fluctuation of the crankshaft 26 of the internal combustion engine 10 when the user drives the vehicle. This enlarges the set of operating points (operation range) of the internal combustion engine 10 at which the filter regeneration process can be executed through the dither control. That is, if the dither control is prohibited, the filter regeneration process is executed by setting the base requirement value $\alpha 0$ to a great value even in the relatively low load operation region, in which the exhaust temperature is low.

Next, the CPU 62 determines whether it is receiving a shift change execution flag (S50). When determining that the flag is being received (S50: YES), the CPU 62 substitutes 0 for the base requirement value $\alpha 0(n)$ (S52) so as to stop the dither control. When the process of S52 is completed or when the determination is negative in S50, the CPU 62 executes the processes of S54 to S64, which correspond to the processes of S20 to S32 of FIG. 3.

When the processes of S44, S64 are completed or when the determinations are negative in the processes of S42, S46, the CPU 62 temporarily ends the series of processes shown in FIG. 4. When the filter regeneration process is completed, the CPU 62 deletes the history of lighting the warning lamp 82 stored in the nonvolatile memory 66.

The operation of the present embodiment will now be described.

Figure 5:
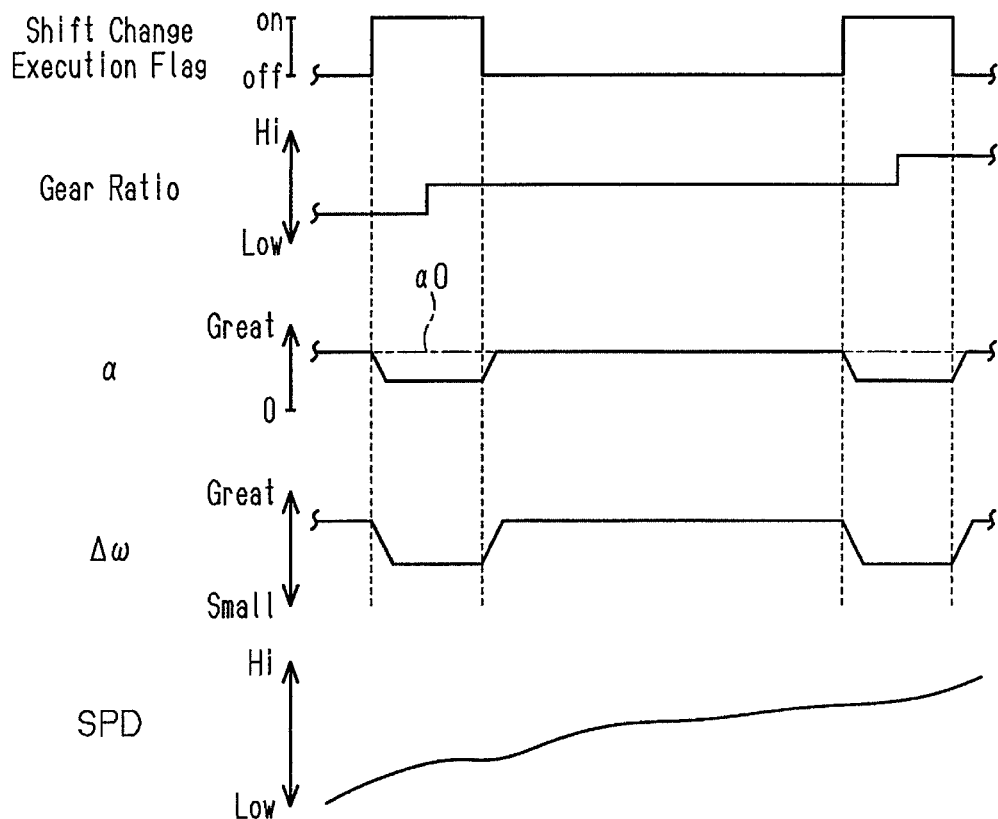
FIG. 5 is a timing diagram illustrating a limiting process of the dither control process according to the embodiment.

FIG. 5 shows movements the shift change execution flag, the gear ratio, the correction requirement value $\alpha$, the rotational fluctuation $\Delta\omega$ of the crankshaft 26, and the vehicle speed SPD when there is a warm-up requirement of the three-way catalyst 22. The rotational fluctuation $\Delta\omega$ is defined, for example, by the amount of change in the difference in the rotation speed (instantaneous rotation speed co) between cylinders of temporally sequential compression top dead centers in a predetermined angular range near the compression top dead center of each cylinder.

As shown in FIG. 5, when the shift change execution flag is input, the CPU 62 gradually reduces the correction requirement value $\alpha$. When the input of the shift change execution flag is stopped, the CPU 62 gradually increases the correction requirement value $\alpha$ to the base requirement value $\alpha 0$. Thus, when the process of changing the gear ratio is actually executed, the correction requirement value $\alpha$ is set to a value smaller than the base requirement value $\alpha 0$, so that the rotational fluctuation $\Delta\omega$ of the crankshaft 26 can be reduced as compared with the case in which the correction requirement value $\alpha$ is set to the base requirement value $\alpha 0$. That is, a limiting process of limiting the dither control process is executed such that the difference in the air-fuel ratio between the cylinders is smaller in a change period, in which the gear ratio of the multi-speed transmission is changed, than in the periods except for the change period. Therefore, it is possible to limit deterioration of the controllability of the control of changing the gear ratio. In addition, continuation of the dither control process with a reduction of the correction requirement value $\alpha$ without stopping the dither control itself allows for an early satisfaction of the requirement of warm-up the three-way catalyst 22.

Figure 6:
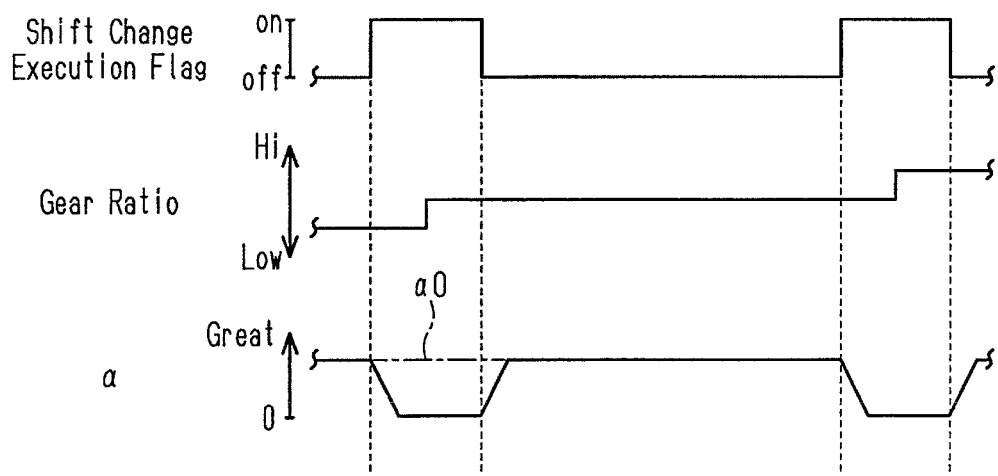
FIG. 6 is a timing diagram illustrating a limiting process of the dither control process according to the embodiment.

FIG. 6 shows the movements of the shift change execution flag, gear ratio, and correction requirement value $\alpha$ during the filter regeneration process.

As shown in FIG. 6, when the shift change execution flag is input, the CPU 62 gradually reduces the correction requirement value $\alpha$ to zero. When the input of the shift change execution flag is stopped, the CPU 62 gradually increases the correction requirement value $\alpha$ from zero to the base requirement value $\alpha 0$, thereby resuming the dither control. Accordingly, when the process of changing the gear ratio is actually executed, the dither control is stopped, so that it is possible to avoid the occurrence of rotational fluctuation that is undesirable for the control of the gear ratio due to the dither control.

In particular, in the present embodiment, the filter regeneration process is to be executed at the repair shop. The filter regeneration process at the repair shop can be executed while setting the operating range of the internal combustion engine 10 to a range that is to a certain extent suitable for the filter regeneration process. In addition, the time (for example, several tens of minutes) allotted to the dither control for the filter regeneration process is longer than the time (for example, several tens of seconds) allotted to the dither control of warming up the three-way catalyst 22. Therefore, even if the dither control is temporarily stopped to change the gear ratio, the filter regeneration process can be sufficiently executed.

Moreover, especially in the region where the load is relatively small, the filter regeneration process according to the present embodiment sets the correction requirement value $\alpha$ to a value that allows for a rotational fluctuation greater than that allowed during normal driving. Thus, in the case in which the dither control is continued while reducing the correction requirement value α in the region where the load is relatively small, it is necessary to make the reduction amount extremely large. Therefore, the difference between continuation of the dither control with a reduction in the correction requirement value α and temporary stop of the dither control is inconspicuous.

<Correspondence>

The correspondence between the items in the above embodiments and the items described in the above SUMMARY is as follows. Below, the correspondence is shown for each of the numbers in the above SUMMARY.

In Example 1, the exhaust purification device corresponds to the three-way catalyst 22 and GPF 24. The dither control process corresponds to the processes of the correction coefficient calculating section M20, the dither correcting section M22, the multiplication section M24, the correction coefficient calculating section M26, the dither correcting section M28, and the injection amount operating section M30, and the processes of S20 to S28 (S54 to S62). The limiting processing corresponds to the process of S18 of FIG. 3 and the process of S52 of FIG. 4.

In Example 2, the reduction process corresponds to the process of S18 of FIG. 3.

Example 3 corresponds to the process of FIG. 3.

In Example 4, the prohibition process corresponds to the process of S52 of FIG. 4.

In Example 5, the filter corresponds to the GPF 24. The notification device corresponds to the warning lamp 82. The notification process corresponds to the process of S44.

Other Embodiments

At least one feature of the above-illustrated embodiment may be modified as follows.

Regarding Notification Device and Notification Process

The notification device is not limited to a device that outputs visual information like the warning lamp 82, but may be a device that outputs auditory information. In this case, the notification process is a process of controlling the auditory information by operating the auditory device.

Regarding Reduction Process

In the process of FIG. 3, the reduction process is executed as the process of multiplying the base requirement value α0 by the correction factor Klim, but the reduction process is not limited to this. For example, the reduction process may be executed as a process of substituting, for the base requirement value α0, the smaller one of the base requirement value α0 and the upper limit guard value for the shift change period. It is desirable that the upper limit guard value be variably set in accordance with the operating point of the internal combustion engine 10. Also, the processes of S16 and S18 of FIG. 3 may be omitted, and the value obtained by multiplying the correction requirement value α calculated by the processes of S22, S26, S28 by the correction factor Klim in the case of the shift change period may be substituted for the correction requirement value α and outputted.

The dither control that is subjected to the reduction process is not limited to the dither control executed in response to the warm-up requirement of the three-way catalyst 22. The dither control subjected to the reduction process may be, for example, the above-described filter regeneration process. Also, the reduction process may be executed in place of the prohibition process only in the case in which the filter regeneration process dedicated for the high-load region, which will be described in the section Regarding Exhaust Temperature Increase Requirement below, is executed. Further, the above-described embodiment may be applied to the dither control for the sulfur release process described, for example, in the section Regarding Exhaust Temperature Increase Requirement below. The reduction process does not necessarily need to be executed.

Regarding Prohibition Process

In the process of FIG. 4, the prohibition process is executed as the process of setting the base requirement value α to zero, but the prohibition process may be executed as a process of setting the correction requirement value α to zero.

The dither control to be subjected to the prohibition process is not limited to the above-described filter regeneration process. For example, the dither control to be subjected to the prohibition process may be the dither control for sulfur release process described in the section Regarding Exhaust Temperature Increase Requirement below. However, when the sulfur poisoning amount increases to some extent, it is desirable to stop applying the prohibition process to the dither control for the sulfur release process and to start applying the reduction process.

Regarding Dither Control Process

The correction requirement value α may be variably set in accordance with the coolant temperature THW in addition to the engine speed NE and the load factor KL. Further, for example, the correction requirement value α may be variably set based only on two parameters such as the engine speed NE and water temperature THW or the load factor KL and the coolant temperature THW. Also, the injection amount correction requirement value α may be variably set based on only one of the three parameters. Instead of the engine speed NE and the load factor KL are used as parameters for determining the operating point of the internal combustion engine 10. For example, instead of the load factor KL, which is a load, the accelerator operation amount may be used as a load. Alternatively, the correction requirement value α may be variably set in accordance with the intake air amount Ga instead of the engine speed NE.

It is not essential to vary the base requirement value α0 based on the above parameters. The base requirement value α0 may be a fixed value, for example.

In the above-described embodiment, the number of the lean combustion cylinders is greater than the number of the rich combustion cylinders, but the configuration is not limited to this. For example, the number of the rich combustion cylinders and the number of the lean combustion cylinders may be equal to each other. Alternatively, instead of setting all the cylinders #1 to #4 to either a lean combustion cylinder or a rich combustion cylinder, the air-fuel ratio of one cylinder may be set to the target air-fuel ratio. Furthermore, if the cylinder filling air amount remains constant in one combustion cycle, the reciprocal of the mean value of the fuel-air ratios does not need to be the target air-fuel ratio. For example, in the case of four cylinders as in the above-described embodiment, if the cylinder filling air amount remains constant, the reciprocal of the mean value of the fuel-air ratios at five strokes may be used as the target air-fuel ratio. Also, the reciprocal of the mean value of the fuel-air ratios at three strokes may be used as the target air-fuel ratio. However, it is desirable that a period in which both a rich combustion cylinder and a lean combustion cylinder exist in a single combustion cycle occurs at least once every two combustion cycles. In other words, if the cylinder filling air amount remains constant, it is desirable to set the predetermined period to two or fewer combustion cycles when setting target air-fuel ratio to the reciprocal of the mean value of the fuel-air ratios. For example, if the predetermined period is set to two combustion cycles and the rich combustion cylinder exists only once during two combustion cycles, the appearance order of the rich combustion cylinder and the lean combustion cylinder is represented by R, L, L, L, L, L, L, L, where the lean combustion cylinder is represented by R, and the lean combustion cylinder is represented by L. In this case, a period of one combustion cycle that is shorter than the predetermined period and represented by R, L, L, L is provided, and part of cylinders #1 to #4 is a lean combustion cylinder and the other cylinders are rich combustion cylinders. When the reciprocal of the mean value of the fuel-air ratios of periods different from one combustion cycle is used as the target air-fuel ratio, it is desirable that the amount of air that is drawn into the internal combustion engine in the intake stroke and is blown back to the intake passage before the intake valve closes be negligible.

Regarding Exhaust Temperature Increase Requirement

Requirements for the filter regeneration process are not limited to those in the above-described embodiment. For example, when the PM deposition amount DPM, is less than the threshold value Dth and greater than or equal to a predetermined value that is less than the threshold value Dth, the dither control may be executed to execute the filter regeneration process on condition that the engine is in the high load region.

The temperature increase requirement is not limited to the one in the above-described embodiment. The temperature increase requirement may arise when there is a requirement for executing the sulfur release process. The temperature increase requirement by the sulfur release process only needs to arise when the sulfur poisoning amount of the three-way catalyst 22 becomes greater than or equal to a predetermined value. The sulfur poisoning amount can be calculated such that, for example, the increase amount of the poisoning amount increases as the engine speed NE increases and the load factor KL increases, and the sulfur poisoning amount can be calculated by integrating the increase amount. However, when the dither control is executed, the increase amount of the poisoning amount is reduced as compared with the case in which the dither control is prohibited. Also, a temperature increase requirement may arise, for example, when the three-way catalyst 22 is in an operation region in which sulfur tends to accumulate (for example, the idling operation region).

Further, for example, a temperature increase requirement of the exhaust gas by the dither control may arise in order to raise the temperature of the exhaust passage 20 so as to suppress collection of condensed water onto the exhaust passage 20.

Regarding Exhaust Purification Device subject to Temperature Increase

In the above-described configuration, the three-way catalyst 22 and the GPF 24 are presented as the exhaust gas purification devices to be heated by the dither control process, but the configuration is not liinited this. For example, the exhaust gas purification device to be heated by the dither control process may be only the GPF 24. In this case, however, it is desirable to impart the oxygen storage capacity to the GPF 24 in order to improve the temperature increasing performance by the dither control.

Regarding Controller

The controller is not limited to a device that includes the CPU 62 and the ROM 64 and executes software processing. For example, at least part of the processes executed by the software in the above-illustrated embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

In the above-described embodiment, it is assumed that the transmission controller 40 and the controller 60 are separate from each other, but the configuration is not limited to this. For example, the functions of the transmission controller 40 and the controller 60 may be implemented by a single electronic control unit of the drive system.

Regarding Internal Combustion Engine

The internal combustion engine is not limited to a four-cylinder engine. For example, an in-line six-cylinder engine may be used. Alternatively, a V engine may be used, which includes a first exhaust purification device and a second exhaust purification device that purify exhaust gas from different cylinders. Also, an internal combustion engine equipped with a forced-induction device may be used. In the case of the internal combustion engine equipped with a forced-induction device, the temperature of the exhaust purification device located downstream of the forced-induction device is not easily increased since the heat is drawn from the exhaust gas by the forced-induction device. Thus, it is particularly effective to use the dither control.

Other Modifications

The fuel injection valve is not limited to one that injects fuel into the combustion chamber 14, but may be one that injects fuel, for example, into the intake passage 12. The air-fuel ratio feedback control does not necessarily need to be executed when the dither control is executed.

Therefore, the present examples and embodiments are to be considered as illustrative and not restrictive and the disclosure is not to be limited to the examples and embodiments given herein.

The invention claimed is:

1. A controller for an internal combustion engine that includes an exhaust purification device, which purifies exhaust gas discharged from a plurality of cylinders, fuel injection valves provided for the respective cylinders, and a multi-speed transmission coupled to a crankshaft, the controller being configured to execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio, and a limiting process of limiting the dither control process such that a difference in the air-fuel ratio between the cylinders is smaller in a change period, in which a gear ratio of the multi-speed transmission is changed, than in periods except for the change period.

2. The controller for an internal combustion engine according to claim 1, wherein the limiting process includes a reduction process of reducing the difference between the air-fuel ratio of the rich combustion cylinder and the air-fuel ratio of the lean combustion cylinder.

3. The controller for an internal combustion engine according to claim 2, wherein
the controller executes the dither control process when a warm-up requirement of the exhaust purification device arises, and
the controller applies the reduction process to the dither control process executed in response to the warm-up requirement of the exhaust purification device.

4. The controller for an internal combustion engine according to claim 1, wherein the limiting process includes a prohibition process, in which the controller prohibits the dither control process even if there is a temperature increase requirement of the exhaust gas by the dither control.

5. A control method for an internal combustion engine that includes an exhaust purification device, which purifies exhaust gas discharged from a plurality of cylinders, fuel injection valves provided for the respective cylinders, and a multi-speed transmission coupled to a crankshaft, the control method comprising:
operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and
limiting the dither control process such that a difference in the air-fuel ratio between the cylinders is smaller in a change period, in which a gear ratio of the multi-speed transmission is changed, than in periods except for the change period.

6. A controller configured to control an internal combustion engine that includes an exhaust purification device, which purifies exhaust gas discharged from a plurality of cylinders, fuel injection valves provided for the respective cylinders, and a multi-speed transmission coupled to a crankshaft, wherein
the controller comprises processing circuitry
the processing circuitry is configured to execute
a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio, and
a limiting process of limiting the dither control process such that a difference in the air-fuel ratio between the cylinders is smaller in a change period, in which a gear ratio of the multi-speed transmission is changed, than in periods except for the change period.

* * * * *